US005571262A

United States Patent [19]
Camboulives

[11] Patent Number: 5,571,262
[45] Date of Patent: Nov. 5, 1996

[54] SUPERSONIC NOZZLE FOR A TURBOJET ENGINE

[75] Inventor: André A. M. L. Camboulives, Savigny sur Orge, France

[73] Assignee: Societe Natinonale d'Etude ed de Construction de Moteurs d'Aviation S.N.E.C.M.A., Paris Cedex, France

[21] Appl. No.: 573,700

[22] Filed: Jan. 12, 1984

[30] Foreign Application Priority Data

Jan. 13, 1983 [FR] France ................................. 83 00423

[51] Int. Cl.$^6$ ........................................................ F02K 1/11
[52] U.S. Cl. .............................. 239/265.39; 239/265.37; 239/265.33; 239/265.19; 60/242; 60/271
[58] Field of Search ......................... 239/265.37, 265.39, 239/265.11, 265.19, 265.33, 265.41; 60/242, 271

[56] References Cited

U.S. PATENT DOCUMENTS

| | | | |
|---|---|---|---|
| 3,739,987 | 6/1973 | Servanty | 239/265.39 |
| 3,873,027 | 3/1975 | Camboulives | 239/265.33 |
| 3,973,731 | 8/1976 | Thayer | 239/265.39 |
| 4,196,856 | 4/1980 | James | 239/265.39 |
| 4,307,839 | 12/1981 | Nicoloff | 239/265.39 |
| 4,361,281 | 11/1982 | Nash | 239/265.37 |
| 4,392,615 | 7/1983 | Madden | 239/265.37 |
| 4,552,309 | 11/1985 | Szuminski et al. | 239/265.19 |
| 4,621,769 | 11/1986 | Szuminski | 239/265.39 |
| 4,641,782 | 2/1987 | Woodward | 239/265.29 |
| 5,110,050 | 5/1992 | Nightingale | 239/265.39 |
| 5,269,466 | 12/1993 | Maguire | 239/265.39 |

*Primary Examiner*—Harold J. Tudor
*Assistant Examiner*—Christopher K. Montgomery
*Attorney, Agent, or Firm*—Bacon & Thomas

[57] ABSTRACT

Disclosed is a variable supersonic nozzle for a turbojet engine having an improved control system for varying the convergent and divergent nozzle flaps. All of the flaps are supported on several beams about the circumference of a gas passage. A control linkage interconnects hydraulic control cylinders, which are also mounted on the beams, with the convergent and divergent flaps such that, as the piston rod of the hydraulic control system extends and retracts, the angles of the flaps are varied accordingly. Additionally, cold flaps may be attached to the beams and interconnected with the linkage system such that their positions may also be varied by the control cylinder.

16 Claims, 4 Drawing Sheets

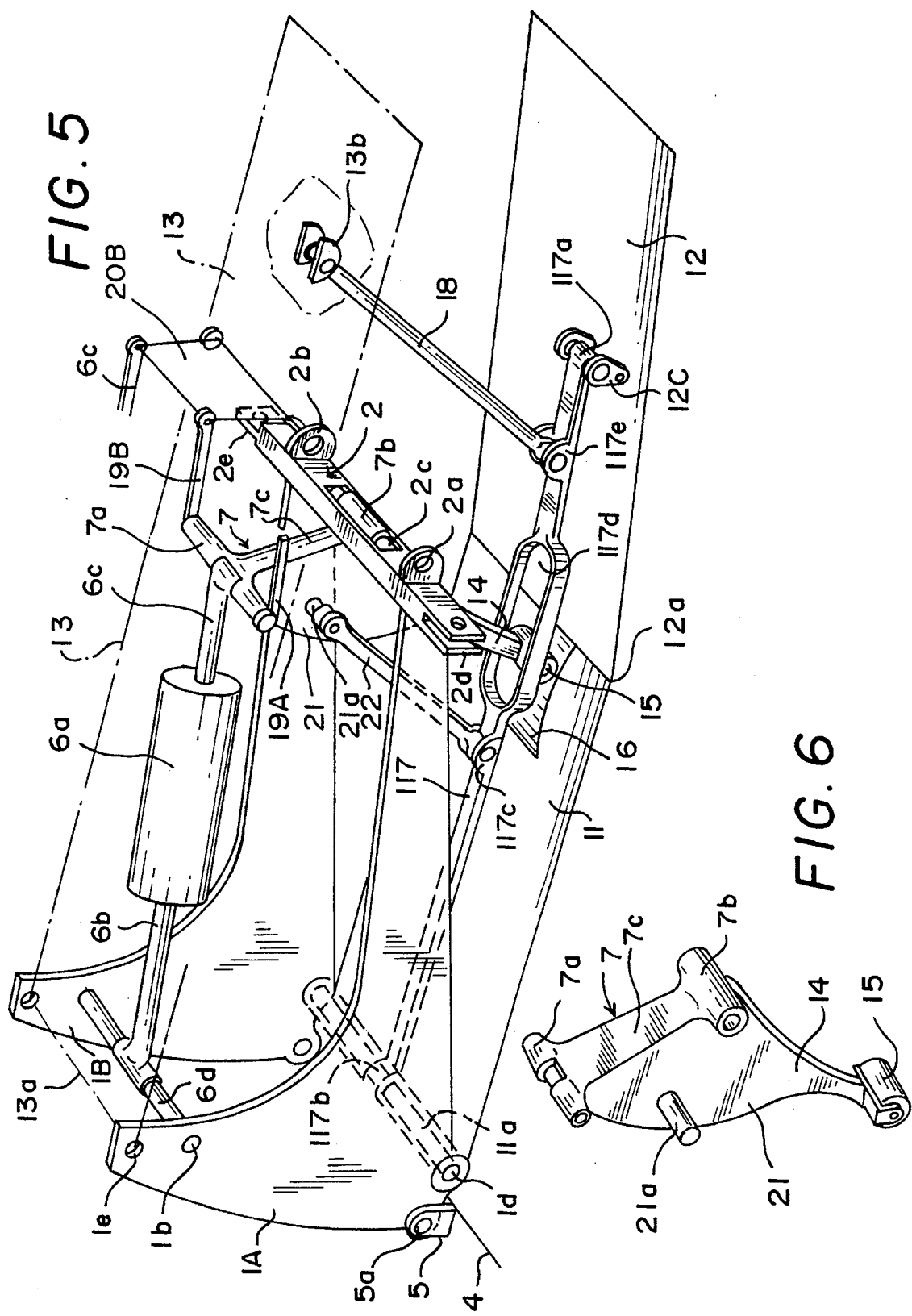

SUPERSONIC NOZZLE FOR A TURBOJET ENGINE

BACKGROUND OF THE INVENTION

1. Field of the Invention

The present invention concerns a supersonic nozzle, in particular a supersonic nozzle for a turbojet engine.

2. Brief Description of the Prior Art

French Patent Application 80.27788, filed in the name of the instant applicant on 30 Dec. 1980, describes a supersonic nozzle comprised of beams mounted longitudinally, at regular intervals, around the circumference of the fixed passage of the nozzle; convergent flaps, each having its upstream end hinged between the upstream ends of two adjacent beams; divergent flaps, each having its upstream end hinged at the downstream end of one of the convergent flaps; and, actuating cylinders, each having its housing hinged at the upstream ends of two adjacent beams, and its rod hinged at about the middle of an actuating lever that extends in the peripheral direction of the nozzle and with which the actuating levers of the corresponding convergent and divergent flaps are coupled.

French Patent Application 80.01814, which the present applicant filed on 25 Jan. 1980, as well as the first certificate of addition, 80.18329, filed on 22 Aug. 1980, describe supersonic nozzles, the various moving parts of which are supported by carrier rings. Each of these is connected to the fixed passage of the nozzle by short hinges, clevises in particular, which comprise what is, relatively speaking, a less rigid structure; each control actuating cylinder also is mounted between two longitudinal cross ties, but these are independent of the fixed passage. The rod of each actuating cylinder has its end hingedly attached to a lever in the form of a triangular or rectangular plate, two corners of which are hinged on the corresponding ends of two rods, forming, with the aforesaid levers, part of the device for synchronizing the movement of different flaps.

French Patent Application 81.21980, which the applicant filed on 24 Nov. 1981, also describes a supersonic nozzle, the various moving parts of which are carried by an annular structure made up essentially of the housings of the different control actuating cylinders, which are hinged on the fixed passage of the nozzle. The rods of the different control actuating cylinders, which are turned upstream, are intercoupled by different hinged levers and rods comprising an annular, toothed kinematic chain for synchronizing the movements of the different flaps.

SUMMARY OF THE INVENTION

The supersonic nozzle in accordance with the present invention is of a type similar to those of the known prior art, but is distinguished by an improvement in the parts, in particular the longitudinal beams which have two side pieces connecting the different moving parts of the nozzle to its fixed passage, and by a new flap actuating mechanism comprising, in particular, synchronization levers and different actuating levers. This new actuating mechanism is particularly well adapted to the new bearing structure for the movable parts of the nozzle.

The supersonic nozzle in accordance with the present invention is characterized by the fact that the two beams are comprised of two longitudinal side pieces interconnected by a plate; and, the downstream ends of the pairs of side pieces are connected in the peripheral direction by flanged parts having a slot which, with the aforesaid beams, form rigid boxes, which are intercoupled by hinges, so as to form, in a plane normal to the axis of the nozzle, a virtually undeformable ring integral with the boxes.

A synchronization lever having an approximately H-shape is arranged in a transverse plane and is connected to an actuating lever and to a slaving member of the corresponding convergent and divergent flaps. One of its two parallel legs is hingedly connected to a flange of a corresponding beam, and its other leg is hinged, near its mid-point to the end of an actuating cylinder piston rod mounted on the corresponding beam. Its ends are connected to two longitudinal rods that are part of a device for synchronizing the movements of the different flaps, made up, in known fashion, in the form of an annular toothed kinematic chain, which comprises in addition members in trapezium shape with an inner side hinged at adjacent beams or at the flanges of two adjacent boxes, and an outer side, hinged at the aforesaid synchronization rods.

The supersonic nozzle in accordance with the present invention offers advantages that provide it with a particularly strong bearing structure for the moving parts, and with a new mechanism for controlling the moving parts that is particularly well adapted to this new bearing structure.

By way of examples, two embodiments of the supersonic nozzle in accordance with the present invention are described in what follows, and are illustrated schematically in the attached drawings.

BRIEF DESCRIPTION OF THE DRAWINGS

FIG. 5 is a partial perspective view of a second embodiment of the invention.

FIG. 6 is a perspective view of the actuating lever utilized in the embodiment shown in FIG. 5.

DETAILED DESCRIPTION OF THE PREFERRED EMBODIMENTS

Only what is necessary for an understanding of the invention will be described and represented in what follows. In particular, the joints needed to ensure the seal between flaps, longitudinally and peripherally, have not been shown, nor have the joints between the fixed part of the passage and/or the terminal part of the cell and the flaps themselves. The different ways in which these seals can be ensured are well known to the expert and are not part of the invention.

Figure 1:
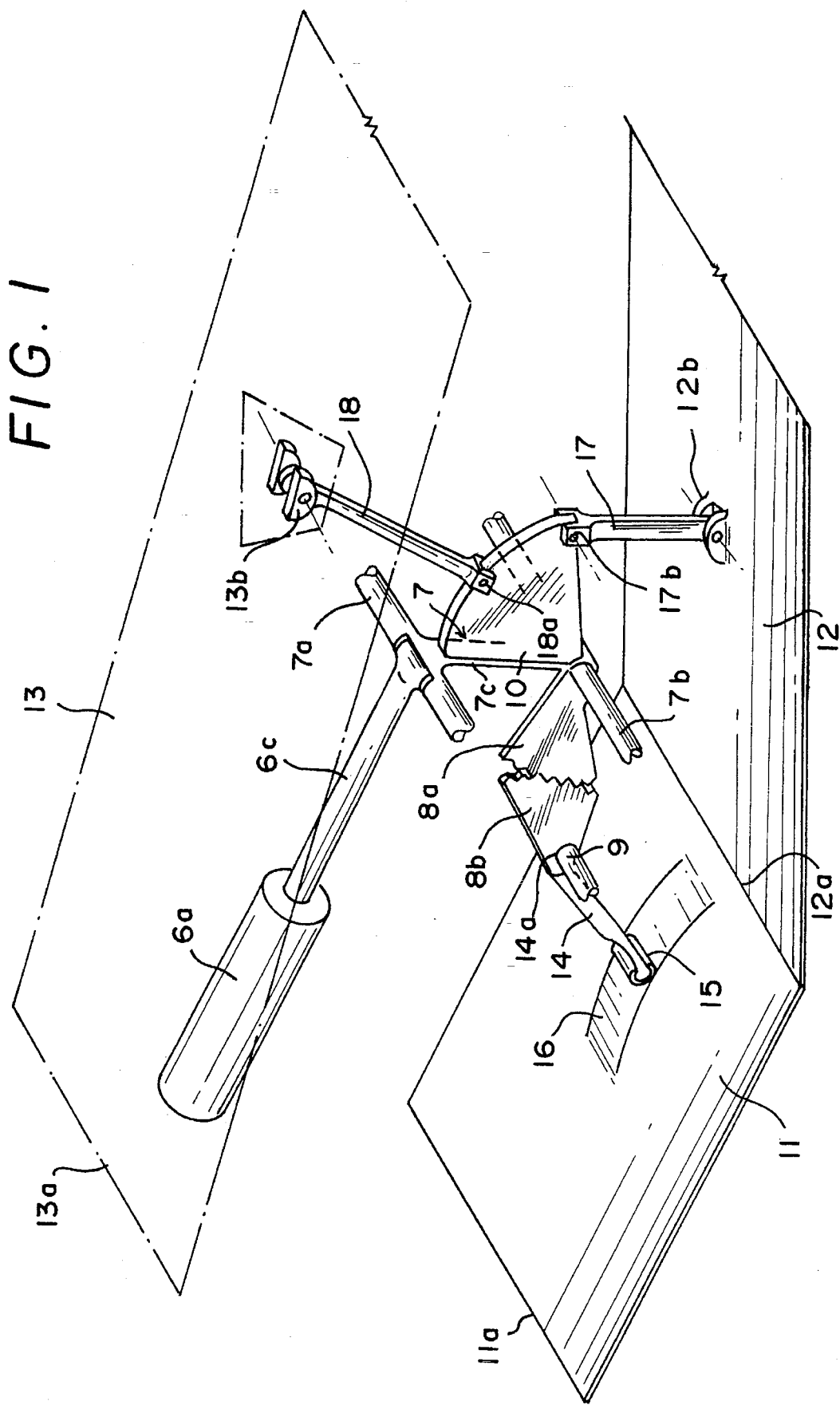
FIG. 1 is a partial perspective view of the first embodiment of the invention.
Figure 2:
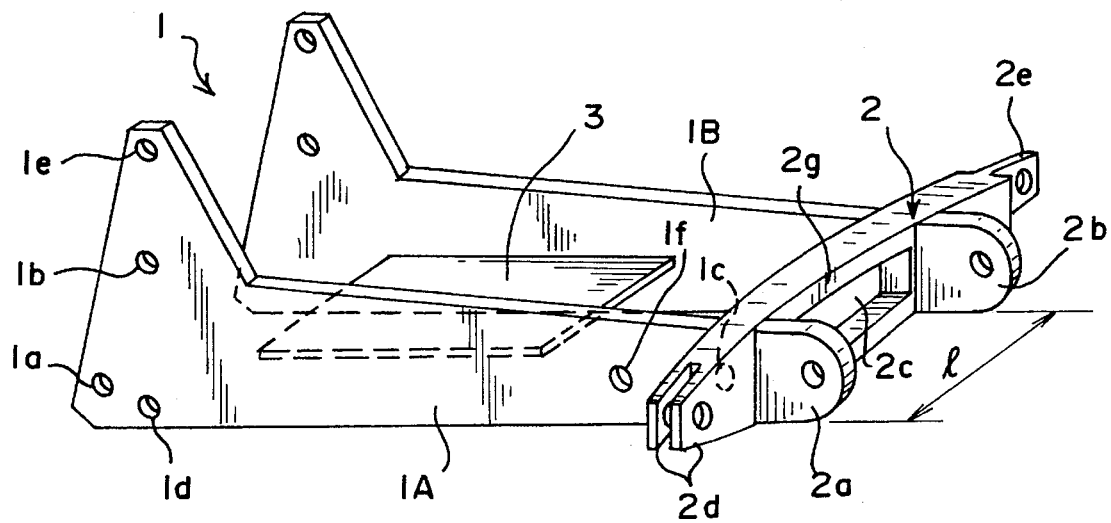
FIG. 2 is a perspective view of one of the bearing beams in the embodiment shown in FIG. 1.
Figure 4:
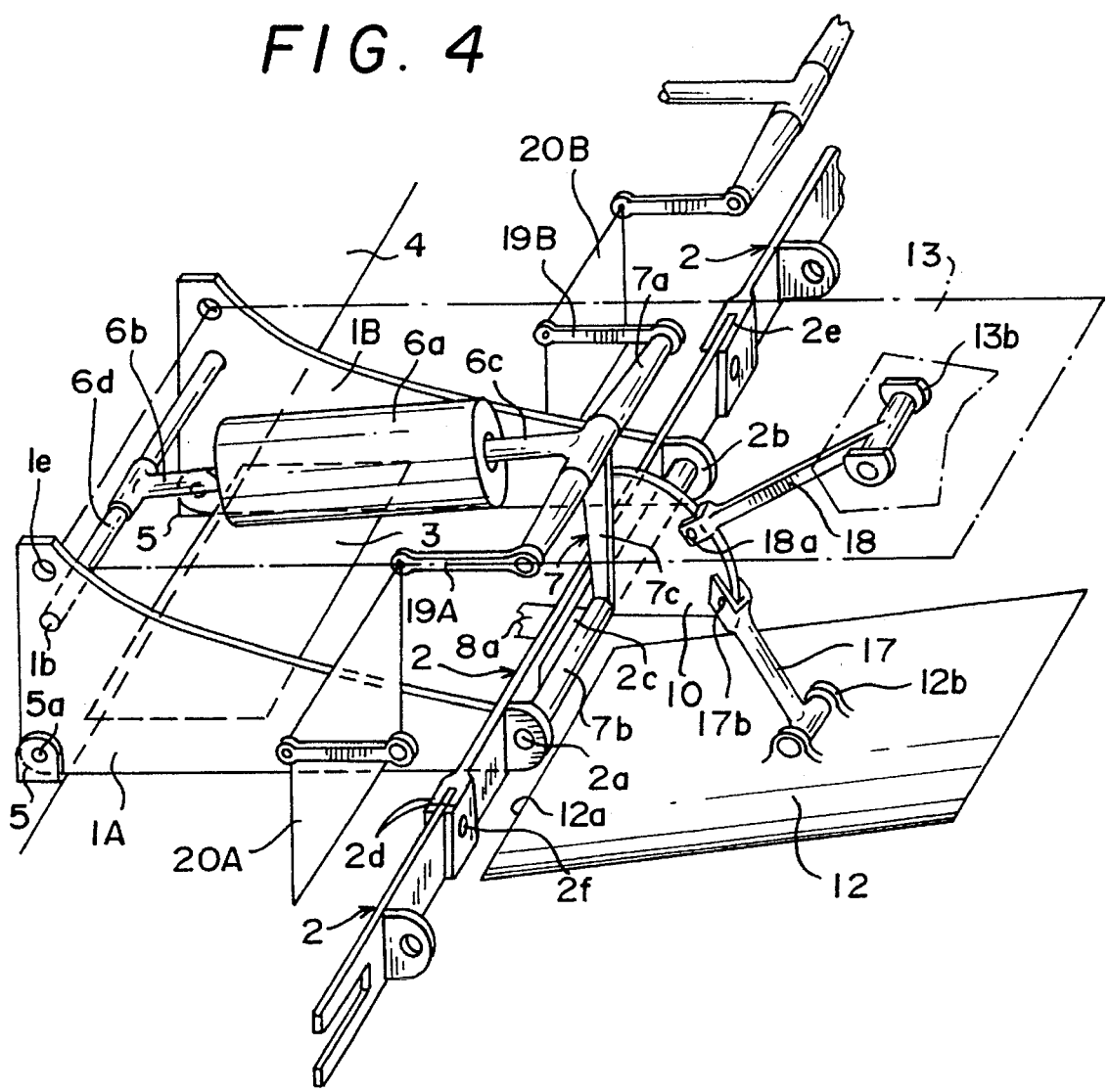
FIG. 4 is a partial perspective view illustrating the synchronization device in the embodiment shown in FIGS. 1 and 2, the assembly of parts being reduced to the same tangent plane to facilitate understanding.

The supersonic nozzle in accordance with the present invention, and which is illustrated in FIGS. 1, 2 and 4, comprises a bearing structure, annular in shape, arranged on the extension of the exhaust from the fixed passage of the aforesaid nozzle. This bearing structure is formed by beams 1 of the type illustrated in FIG. 2, and which are distributed about the circumference of the fixed part of passage 4, spaced at intervals that are of the same order of magnitude, or smaller, than the width of each beam in the peripheral direction of the nozzle (1 in FIG. 2). Each beam 1 is made up essentially of two side pieces 1A and 1B which, in the embodiment shown in FIG. 2, are each made of a metal plate, the contour of which is optional (the different contours are illustrated in FIGS. 2, 4 and 5, respectively). These two side pieces have their downstream ends (to the right in FIG. 2) connected by part 2g of flange 2, on the downstream face of which, on the extension of side pieces 1A and 1B, are two lugs, 2a and 2b, between which flange 2 is traversed by a median slot 2c. Flange 2 extends toward the outside of the beam thus formed, beyond side piece 1A by female clevis 2d and beyond side piece 1B by male clevis 2e, or vice versa. Finally, the median parts of the two side pieces 1A and 1B are connected by plate 3 which, in the example illustrated in FIG. 2, is approximately parallel to the lower sides of the two side pieces 1A and 1B and is rectangular in shape. It is understood that the assembly formed by parts 1A, 1B, 2 and 3 comprise, with the downstream ring of the passage, a rigid metal support beam.

As is shown in FIG. 4, the two side pieces 1A and 1B of each beam 1 are hingedly attached to the exhaust side of the fixed part of passage 4 of the nozzle, by clevises 5, for example. The axes of the clevises 5a pass through the corresponding holes (1a in FIG. 2) of the corresponding beams, for example 1A, such that they are arranged so as to extend generally in the longitudinal direction of the nozzle, that is, parallel to its axis in a plane at least approximately axial and, more precisely in a preferred solution, side pieces 1A and 1B are parallel to each other, and parallel to the median axial plane of beam 1, the width 1 of each beam being a high-order sub-multiple of the perimeter of a circle centered on the axis of the nozzle and passing near the bases of two lugs 2a and 2b (FIG. 2), for example. As a result of this longitudinal arrangement of side pieces 1A and 1B of each beam, its flange 2 extends in the peripheral direction of the nozzle, parallel to the side of passage 4. The flanges of two adjacent beams are hinged at their corresponding extremities in the interval between two beams thanks to the engagement of the male clevis (2e in FIG. 2) of one of the two flanges 2 in the female clevis 2d of the adjacent flange, the hinge being made by a pin which has been marked 2f in FIG. 4. It is understood that the different flanges 2, thus hinged at their adjacent ends form a ring in a plane normal to the axis of the nozzle that is integral with the different beams and which forms with them and the downstream ring of the passage an undeformable structure that is connected to the side of fixed passage 4 at clevises such as 5.

As seen in FIG. 4, housing 6a of an actuating cylinder is mounted on each beam formed by members 1A, 1B and 2 about plate 3 which connects side pieces 1A and 1B. In the embodiment illustrated, housing 6a of the actuating cylinder, or rather an extension 6b of its bottom, is hinged on shaft 6d, the ends of which are held in holes 1b (see also FIG. 2) of the upstream upper parts of side pieces 1A and 1B. The arrangement is such that the geometric axis of housing 6a of the actuating cylinder is in a plane passing through the axis of the nozzle and through the mid-point of shaft 6d. This plane will be designated the median plane of beam 1 (formed by members 1A-1B-2 and 3). Piston rod 6c of the actuating cylinder extends downstream that is to the right in FIGS. 1 and 4 and is hinged at its end to the middle of one, 7a, of the two parallel legs of the H-shaped synchronization lever 7. The other parallel leg 7b is located toward the interior of the nozzle with respect to leg 7a and its ends are hingedly attached in the corresponding holes in the two lugs 2a and 2b in the downstream face of flange 2. The two parallel legs 7a and 7b of H-shaped lever 7, therefore, extend in the peripheral direction of the nozzle, with the result that lever 7c (the middle bar of the H) which connects their respective middles, always will be found in the median plane of corresponding beam 1, already defined, regardless of the extension of rod 6c from the actuating cylinder 6a and, therefore, regardless of the position in space of legs 7a and 7c of H-shaped lever 7.

A first toothed sector 8a is integrally attached at its apex to the median part of the innermost leg 7b of lever 7 or, alternatively, to the innermost part of lever 7c. It passes through the median slot 2c in flange 2 and, upstream from this latter, engages a second toothed sector 8b, these two toothed sectors by preference being in the median plane of the beam, already defined. The second toothed sector 8b is itself mounted so as to pivot on pin 9 (FIG. 1), parallel to leg 7b of lever 7, and having its ends turning freely in holes 1c in the two side pieces 1A and 1B, located just upstream from flange 2, as will be seen in FIG. 2. Finally, a small plate 10 is secured to the downstream side of lever 7c in a manner such that it is in the median plane previously defined.

Associated with each of beams 1, such as those illustrated in FIG. 2, is a convergent flap 11, the upstream side 11a of which is hinged on a pin, the ends of which are inserted in holes 1d (FIG. 2) of the lower upstream parts of side pieces 1A and 1B. A divergent flap 12 has its upstream side 12a hingedly attached to the downstream side of corresponding convergent flap 11 by known means that there is no need to describe in detail. A secondary flap 13, also called a "cold" flap, has its upstream side 13a hinged on a pin which, in turn, has its ends inserted in corresponding holes 1e (FIG. 2) of the upper upstream parts of the two side pieces 1A and 1B of beam 1.

In FIG. 1, 14 designates the actuating lever for convergent flap 11, the outermost end of which is formed integrally at 14a with the apex of second toothed sector 8b. The innermost end of actuating lever 14 carries roller 15 capable of rolling on ramp 16 arranged on the face of convergent flap 11 toward lever 7. Lever 14, roller 15 and ramp 16 are located in the median plane previously defined, and which also is the median plane of convergent flap 11. The profile of ramp 16 is determined as a function of considerations to be explained later on with the aid of FIG. 3. Slaving rod 17 of divergent flap 12 is hinged at one end in clevis 12b, fixed on the face of flap 12 turned toward lever 7, whereas its other end is hinged by clevis 17b on plate 10, in particular in the vicinity of its innermost corner and located farthest downstream. Slaving rod 18 of "cold" flap 13 has one end hinged in clevis 13b, fixed on the face of "cold" flap 13, turned toward lever 7, its other end being hinged by clevis 18a on a point on the circumference of plate 10.

Figure 3:
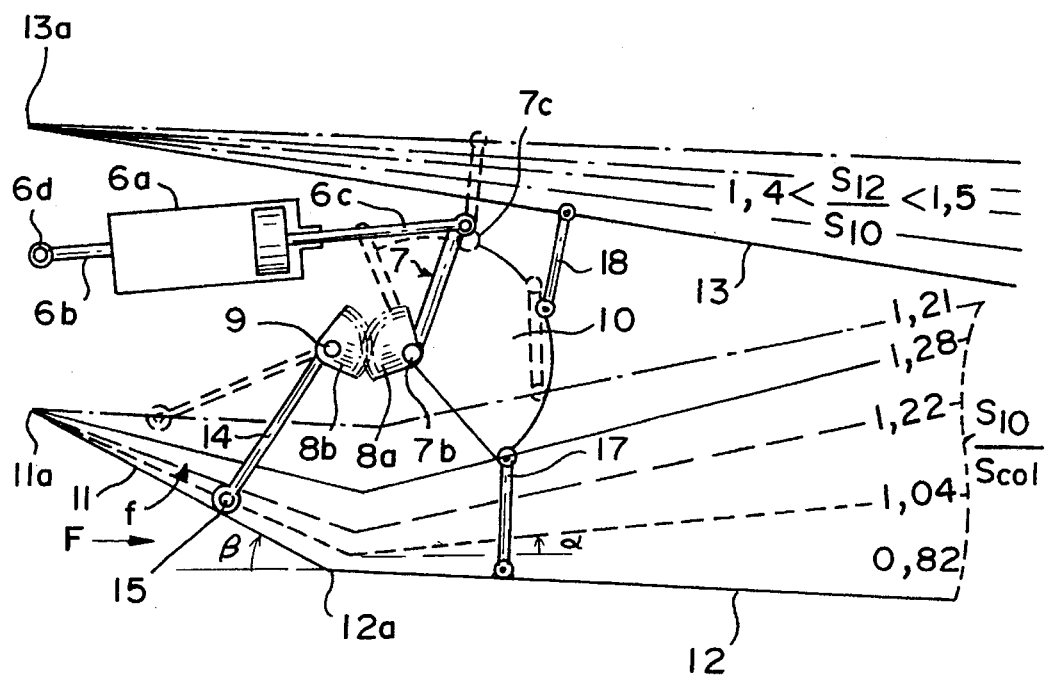
FIG. 3 is a schematic diagram illustrating the operation of the embodiment shown in FIGS. 1 and 2.

Only the three flaps 11, 12 and 13 actuating cylinder 6a and its rods 6b and 6c, lever 7c of the H-shaped lever, the two toothed sectors 8a and 8b, small longitudinal plate 10, actuating levers 14 of convergent flap 11 and slaving rod 17, divergent flap 12, as well as slaving rod 18 of "cold" flap 13 in their respective positions corresponding to the maximum extension of rod 6c from actuating cylinder 6a, are shown in the schematic diagram in FIG. 3. In the positions shown, the angle of deflection β of convergent flap 11 is maximum, and flap 12 is also slightly convergent. The pressure of the stream of hot gases, the axial direction of which is indicated by arrow F on the inner face of convergent flap 11, exerts on this flap a resultant force that tends to cause the flap to pivot about the hinge axis from its upstream side 11a, in the direction of arrow f. The effect is to force the outer face of convergent flap 11 against roller 15 mounted on the innermost end of its actuating lever 14 (in fact, the contact takes place on ramp 16 in FIG. 1, which is not shown in FIG. 3). By construction, in this position, corresponding to the maximum value of the angle of deflection β, the component of the resultant of the thrusts of the hot gases in a direction normal to convergent flap 11 is practically contained within actuating lever 14, working under compression, because in this position the aforesaid lever 14 is practically normal to the plane of flap 11. The corresponding resultant force is transmitted to side pieces 1A and 1B of corresponding beam 1 by pivot shaft 9 of the second toothed sector 8b hinged on side pieces 1A and 1B in holes 1c, as indicated above. Divergent flap 12 is subjected by the hot gases to a relatively weaker thrust, the resultant of which, directed toward the exterior of the nozzle, is transmitted to rod 6c of actuating cylinder 6a by slaving rod 17, plate 10 and lever 7c. In the maximum extended position of its rod, actuating cylinder 6a only has to sustain the relatively weak force corresponding to the pressure applied to divergent flap 12.

In proportion as rod 6c of actuating cylinder 6a retracts into the cylinder housing, lever 7 pivots and, more particularly lever 7c and the first toothed sector 8a with which it is integral, pivot counterclockwise, thus causing the second toothed sector 8b to pivot clockwise. This rotation of the second toothed sector 8b causes roller 15 to roll on ramp 16 (FIG. 1) from right to left in FIG. 3. The thrust of the hot gases therefore causes convergent flap 11 to pivot in the direction of arrow f so as to maintain contact with roller 15, with the resultant progressive reduction in the angle of deflection β of flap 11. Shown in FIG. 3 are the successive positions of convergent flap 11 in proportion as its angle of deflection β decreases, as well as those of divergent flap 12 in proportion as its angle of deflection α increases, after having passed through the zero angle of deflection. The maximum open positions of the two flaps 11 and 12 have been represented by the chain-dotted line, as have the corresponding positions of parts 7c, 10, 14, 17 and 18. In addition, the extreme positions of "cold" flap 13, slaved to divergent flap 12, as well as some of the intermediate positions of flaps 12 and 13, have been represented by solid and chain-dotted lines in the diagram shown in FIG. 3.

It will be seen that in proportion as there is a reduction in the angle of deflection β of convergent flap 11, its actuating lever 14 ceases to be approximately normal to the flap, so that the corresponding component of the resultant thrust to which the aforesaid flap 11 is submitted has the effect of causing the second toothed section 8b to turn on its shaft 9. There thus is transmission, through the first toothed sector 8a and members 7b and 7c of the lever 7 to rod 6c of actuating cylinder 6a, of a progressively increasing force, but one that always is relatively weak, to which there is the obvious addition of the force, equally weak, transmitted to it by divergent flap 12. Consequently, in the minimum extension position of rod 6c of actuating cylinder 6a the latter has only to overcome a relatively weak resultant force.

The law of variation in the angle of deflection β of convergent flap 11 depends in particular on the profile of ramp 16 (FIG. 1) on which roller 15 of actuating lever 14 rides. As for the law of variation in the angle of deflection α for divergent flap 12 as a function of that of the angle of deflection β for convergent flap 11, it will depend in particular on the radii of the two toothed sectors 8a and 8b, and on the positions of hinges 12b and 17b. Also represented by dashed lines on the right side of FIG. 3 are the characteristic values of the variation in the ratio $S_{10}/S_{col}$, that is, the ratio of the transverse sections of the nozzle at the nozzle exhaust ($S_{10}$), that is at the downstream sides of divergent flaps 12 and at the nozzle throat ($S_{col}$), respectively, and designated 12a as well as $S_{12}/S_{10}$ in FIG. 3, that is, the ratio of the sections of the end of the cold flaps to the section of the throat. As shown, the ratio $S_{10}/S_{col}$, varies between 0.82 and 1.21, while $S_{12}/S_{10}$ is between 1.4 and 1.5.

As shown in FIG. 4, the ends of the radially outermost leg 7a of H-shaped lever 7 are attached to two synchronization rods 19A and 19B, the other ends of which are themselves attached to the corresponding corners of two trapezoidal plates 20A and 20B. These plates are arranged so as to extend, at the very least for the maximum extension position of rod 6c in the same plane, normal to the axis of the nozzle and parallel to the plane of the ring formed by flanges 2. As can be seen in FIG. 4, the two outermost corners of each of trapezoidal plates 20A and 20B are hinged at the ends of the corresponding synchronization rods 19A and 19B, whereas the innermost corners of the aforesaid trapezoidal plates are hinged by appropriate shafts in corresponding holes, such as 1f (FIG. 2) in side pieces 1A and 1B of adjacent beams 1. One plate 20A, for example, extends from the outer face of side piece 1A of a first beam 1 in the peripheral direction of the nozzle to the vicinity of the outer face of side piece 1B of an adjacent beam (not shown in FIG. 4). It is understood that plates such as 20A, 20B, etc., can be replaced by trapezoidal frames including in their interior part at least one hole of quite good size, possibly flanged, by preference downstream to increase the permeability of the nozzle to ventilation.

Parts such as 20A, 19A, 7a, 19B, 20B, etc., thus form an annular toothed chain that ensures synchronization of the movements of the different H-shaped levers 7 and, as a result, the movements of the different nozzle flaps, even if one, or several of the corresponding actuating cylinders, such as 6a, cease being supplied with fluid under pressure. Already known are other methods for the synchronization of devices of this kind.

The second embodiment of the invention, illustrated schematically in FIGS. 5 and 6, includes many parts identical with those in the first embodiment previously described. These parts common to the two forms of realization have been designated by the same reference numbers in the set of figures, so it is not necessary to use FIGS. 5 and 6 to describe them. The description of the second embodiment thus can be limited to the parts that differ from those in the first embodiment: the innermost leg 7b of H-shaped lever 7 is mounted in the median slot 2c of flange 2 so as to pivot about an axis that is geometrically conicident with the transverse axis of aforesaid flange 2; lever 7c of H-shaped lever 7 is located permanently on the upstream side of flange 2, and carries toward the upstream side a small plate 21 (see in particular FIG. 6), that extends longitudinally in the median plane of beam 1; actuating lever 14 for convergent flap 11 protrudes from the innermost part of small plate 21 and, through roller 15, works with ramp 16 on the external face of the aforesaid flap 11 as previously described. In this embodiment, slaving rod 117 of corresponding divergent flap 12 has one end 117a that is hinged by a twin yoke 12c on the outer face of flap 12, and another end 117b that is hinged on the hinge pin of the upstream side 11a of corresponding convergent flap 11. The middle part of beam 117 is connected to plate 21 by rod 22, one end of which is hinged on journals, such as 21a, projecting from the outer faces of the aforesaid plate 21 in a direction parallel to that of leg 7b of lever 7. The other end of rod 22 is hinged at an appropriate point on rod 117 by clevis 117c. Because slaving rod 117 of divergent flap 12 is in the median plane of the corresponding beam, it is necessary to plan for a recess 117d in the corresponding part of rod 117 that is long enough and wide enough to permit the passage of actuating lever 14, which is also located in the median plane. Finally, slaving rod 18 of "cold" flap 13 is hinged in clevis 13b mounted on the inner face of aforesaid "cold" flap 13 at one end, and in clevis 117e, planned for an appropriate point on the downstream part of rod 117, at the other end.

The present invention is not limited to the embodiments described in the foregoing. The invention includes all their variants, some of which will be cited hereinafter by way of nonlimiting examples.

Roller 15, which is attached to actuating lever 14 of corresponding convergent flap 11 could be replaced by a runner, or a skid. The assembly of this roller 15 or of the equivalent runner, or skid, and of ramp 16 with which it must work, could be replaced, if necessary, by a completely different longitudinal guide linkage between the innermost end of actuating lever 14 on the one hand, and the outer face of convergent flap 11 on the other. For example, the aforesaid end of actuating lever 14 could be guided in a longitudinal slide arranged on flap 11, the shape of this slide made to correspond to that of ramp 16 or, possibly, by means anticipating varying the length of actuating lever 14 as an appropriate function of the angle of rotation of the second toothed sector 8b (FIG. 1), or of longitudinal plate 21 integral with lever 7 (FIG. 5). The twin yoke 12c, shown in FIG. 5, could be replaced by a runner, or a skid, sliding on a rail.

In the embodiment illustrated in FIGS. 5 and 6, rod 117, which slaves the position of corresponding divergent flap 12, could be offset laterally with respect to the median plane of corresponding beam 1, so there would be no need for recess 117d for the passage of actuating lever 14 of corresponding convergent flap 11. The present invention extends equally to supersonic nozzles of the type indicated without secondary, or "cold" flaps. The pieces connecting the two side pieces 1A and 1B of beam 1 are optional. The transverse plate 3 could be replaced by transverse bars, or other stiffeners. The means used to hinge the adjacent ends of the flanges, such as 2a and 2e of adjacent beams 1, could be made of known mechanical devices different from the clevises described in the foregoing and comprising swivels, for example.

I claim:

1. In a supersonic nozzle for a turbojet engine having a plurality of convergent and divergent flaps pivotally attached together so as to vary the cross section of the nozzle, the improved control system for controlling the orientation of the flaps comprising:

a) a fixed structure defining a passage for the gases of the turbojet engine;

b) a plurality of beam members attached to the fixed structure and extending in a downstream direction from the fixed structure, each beam member defining a median plane extending between its longitudinal centerline and the longitudinal axis of the turbojet engine;

c) means to pivotally attach the upstream end of the convergent flaps to the beam members;

d) means to attach the downstream ends of the beam members together to form a rigid ring;

e) a synchronization lever pivotally attached to each beam member;

f) hydraulic cylinder control means connected between the beam member and the synchronization lever such that, as a piston rod extends and retracts with respect to the cylinder, the synchronization lever is caused to pivot about its attachment to the beam member;

g) first linkage means connecting the synchronization levers to the convergent flaps;

h) second linkage means connecting the synchronization levers to the divergent flaps; and i) third linkage means interconnecting the synchronization levers such that all of the synchronization levers move simultaneously.

2. The improved nozzle flap control system of claim 1 wherein the beam members each comprise:

a) a pair of side pieces extending generally parallel to each other and to the axis of the turbojet engine;

b) a plate member interconnecting the pair of side pieces; and c) a flange member interconnecting the pair of side pieces adjacent their downstream ends.

3. The improved nozzle flap control system of claim 2 wherein the means to attach the downstream ends of the beam members together comprises:

a) lateral extensions of the flange members extending laterally beyond the side pieces, the lateral extensions forming interengaging joints with adjacent lateral extensions; and b) fastening means to fasten the inter-engaging joints together.

4. The improved nozzle flap control system of claim 3 wherein the hydraulic cylinder is attached to the beam member and the synchronization lever such that its longitudinal axis lies in the median plane of the beam member.

5. The improved nozzle flap control system of claim 4 wherein the third linkage means comprises:

a) a first longitudinal rod having a first end pivotally attached to a first synchronization lever;

b) a second longitudinal rod having a first end pivotally attached to a second synchronization lever located adjacent the first synchronization lever; and c) a trapezoidal plate member pivotally attached between adjacent beam members and pivotally connected to second ends of the first and second longitudinal rods.

6. The improved nozzle flap control system of claim 5 further comprising:

a) a plurality of cold flaps, each having its upstream end pivotally attached to a beam member; and b) fourth linkage means interconnecting the cold flap with the second linkage means.

7. The improved nozzle flap control system of claim 6 wherein the first linkage means comprises:

a) a first toothed sector rigidly attached to the synchronization lever;

b) a second toothed sector pivotally attached to the beam member and engaging the first toothed sector;

c) an actuating lever having a first end attached to the second toothed sector and a second end bearing against the convergent flap such that, as the second toothed sector pivots about its axis, the convergent flap pivots about its axis.

8. The improved nozzle flap control system of claim 7 further comprising:

a) roller means attached to the second end of the actuating lever; and b) a profiled ramp formed on the convergent flap on which the roller means rides during movement of the convergent flap.

9. The improved nozzle flap control system of claim 8 wherein the second linkage means comprises:

a) a longitudinal plate rigidly attached to each of the synchronization levers; and b) a slaving link member having a first end pivotally attached to the longitudinal plate and a second end pivotally attached to the divergent flap.

10. The improved nozzle flap control system of claim 9 wherein the fourth linkage means comprises a slaving rod having a first end pivotally attached to the longitudinal plate and a second end pivotally attached to the cold flap.

11. The improved nozzle flap control assembly of claim 10 wherein the longitudinal plate extends from the synchronization lever in the median plane of the beam member.

12. The improved nozzle flap control system of claim 6 wherein the first linkage means comprises:
   a) a longitudinal plate rigidly attached to the synchronization lever;
   b) an actuating lever having a first end rigidly attached to the longitudinal plate and a second end bearing against the convergent flap.

13. The improved nozzle flap control system of claim 12 further comprising:
   a) roller means attached to the second end of the actuating lever; and
   b) a profiled ramp formed on the convergent flap on which the roller means rides during movement of the convergent flap.

14. The improved nozzle flap control system of claim 13 wherein the second linkage means comprises:
   a) a first rod having a first end pivotally attached to the divergent flap and a second end pivotally attached to the upstream end of the convergent flap; and
   b) a second rod having a first end pivotally attached to the longitudinal plate and a second end pivotally attached to the first rod.

15. The improved nozzle flap control system of claim 14 wherein the longitudinal plate extends from the synchronization lever in the median plane of the beam member.

16. The improved nozzle flap control system of claim 15 wherein the fourth linkage means comprises a third rod having a first end pivotally attached to the cold flap and a second end pivotally attached to the first rod.

* * * * *